(12) United States Patent
Pack

(10) Patent No.: US 7,940,279 B2
(45) Date of Patent: May 10, 2011

(54) SYSTEM AND METHOD FOR RENDERING OF TEXEL IMAGERY

(75) Inventor: Robert Taylor Pack, Logan, UT (US)

(73) Assignee: Utah State University, North Logan, UT (US)

(*) Notice: Subject to any disclaimer, the term of this patent is extended or adjusted under 35 U.S.C. 154(b) by 736 days.

(21) Appl. No.: 12/031,088

(22) Filed: Feb. 14, 2008

(65) Prior Publication Data

US 2008/0238919 A1  Oct. 2, 2008

Related U.S. Application Data

(60) Provisional application No. 60/920,206, filed on Mar. 27, 2007.

(51) Int. Cl.
*G09G 5/00* (2006.01)
(52) U.S. Cl. ........................................ 345/582
(58) Field of Classification Search .................. 345/581, 345/582
See application file for complete search history.

(56) References Cited

U.S. PATENT DOCUMENTS

| | | | |
|---|---|---|---|
| 6,483,518 B1 * | 11/2002 | Perry et al. | 345/590 |
| 6,603,484 B1 * | 8/2003 | Frisken et al. | 345/622 |
| 7,420,555 B1 * | 9/2008 | Lee | 345/424 |

* cited by examiner

*Primary Examiner* — Ryan R Yang

(57) ABSTRACT

A point cloud data set may be pre-processed for fast and efficient rendering. The pre-processing may comprise creating an octree hierarchy from the data, generating a level of detail (LOD) representation for each octree node, simplifying the points in each node according to a simplification tolerance, and storing the data structure in a file. Textures associated with each node may be stored in a separate, compressed file, such as a texture atlas. At render time, the octree and LOD hierarchy may be traversed until a suitable LOD node is found. The associated texture data may be accessed, and the node may be rendered as a textured quadrilateral and/or a splat point primitive. In an alternative approach, multiple point cloud datasets may be merged using a global transform function. The merged dataset may be simplified using a hierarchical LOD tree. Textures may be ascribed to each LOD node. The resulting structure may be rendered using splat and billboard point primitives. The model may be streamed over a network to a client where the rendering may take place.

25 Claims, 6 Drawing Sheets

SYSTEM AND METHOD FOR RENDERING OF TEXEL IMAGERY

RELATED APPLICATIONS

This application claims priority to U.S. Provisional Application No. 60/920,206 entitled, "System and Method for Rendering of Texel Imagery," which is hereby incorporated by reference in its entirety.

TECHNICAL FIELD

This disclosure relates generally to systems and methods for rendering textured point cloud (TPC) data sets, and particularly, systems and methods for fast, efficient, and accurate rendering of large TPC data sets, such as those obtained using a high resolution Light Detection and Ranging (LIDAR) imaging system.

BRIEF DESCRIPTION OF THE DRAWINGS

Additional aspects and advantages will be apparent from the following detailed description of preferred embodiments, which proceeds with reference to the accompanying drawings where.

DETAILED DESCRIPTION OF PREFERRED EMBODIMENTS

Figure 1:
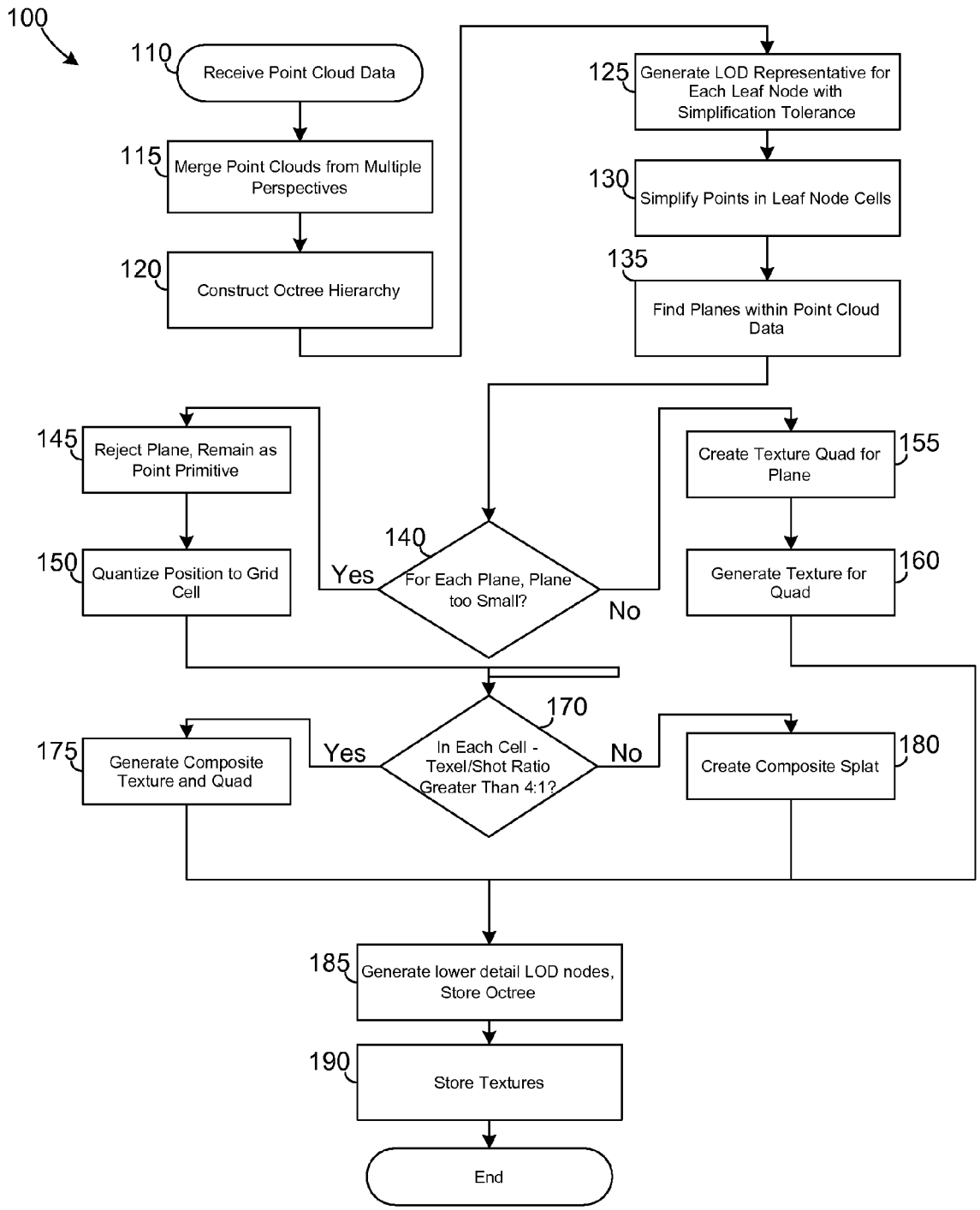
FIG. 1 is a flow diagram of one embodiment of a method for pre-processing texel imagery data.

The embodiments of the disclosure will be best understood by reference to the drawings, wherein like elements are designated by like numerals throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a computer-readable medium having stored thereon instructions that may be used to program a computer (or other electronic device) to perform processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

Several aspects of the embodiments described will be illustrated as software modules or components. As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Disclosed herein is a discussion of the development of efficient simplification and rendering methods for massive textured point clouds (texel images) derived from a texel data source. One example of such a data source is a Texel Camera developed by the Center for Advanced Imaging LIDAR (CAIL) at Utah State University (USU). In development is an Airborne Texel Camera (ATC), which will be capable of acquiring gigasamples of 3D data in a very short period. Because of this, it is important to develop tools that will not only handle the massive data, but also the rich color texture data that may accompany it. However, one skilled in the art would recognize that the teachings of this disclosure could be applied to any texel imagery data obtained from any texel data source (e.g., a texel camera, texel scanner, or the like). As such, this disclosure should not be read as limited to any particular texel imagery data source and/or texel imaging system.

As discussed above, recently developed texel imagery systems are capable of generating datasets containing a high-level of complexity. Such data sets may comprise hundreds of millions of points. It may be efficient to render such datasets as point-based graphic primitives of high visual quality.

Traditional rendering systems have operated well on smaller LIDAR datasets. For example, some Tripod Texel Cameras (TTC) may generate data sets and/or surface scans having a manageable dataset size. A TTC may scan a surface and thereby acquire point cloud and associated color texture data. This data may be brought into a computer graphics engine where it may be represented as a textured irregular network (e.g., mesh) of connected polygons. Each polygon face may be textured with the accompanying color data to create a sense of realistic 3D imagery.

The polygons used in rendering (i.e., in the irregular network) may be primarily triangles or quadrilaterals and may be linked into a plurality of OpenGL® "strip" or "fan" language primitives. These generated texture mapped polygons are a commonly used data type used in computer graphics. As such, a significant amount of accelerated hardware rendering engines exists for rendering these primitives.

The pervasive use of these entities for rendering texel camera data, however, may suffer from significant difficulties, particularly where the TTC is a high resolution TTC capable of generating large point cloud datasets. For example, a high-density point cloud may require a high-density textured mesh that may exceed hundreds of millions of polygons. This number of polygons may be difficult for even high-performance graphics cards and/or graphics processing systems to render. In addition, a scanned object poorly define some of the surfaces (e.g., a tree, bush, or the like) at the scale scanned. As such, the construction of connected polygons may be difficult at best and erroneous at worst. Further, even if a surface does exist, it may be difficult to correctly generate the mesh without some a priori knowledge of the object's surface topology, and there may be no exact way to determine which points should be connected and which lie on different surfaces and should remain unconnected.

In addition, it may be difficult to determine whether an entire surface of a particular object is covered by the union of all polygons from all LIDAR collection views, particularly if only one subset of the point samples from each view is retained. Moreover, when a concave surface is sampled by multiple views, the polygons (e.g., triangles) formed by points in one view may obscure better polygons from other views. This may degrade the quality of the rendered image by causing pixels to be filled using less accurate textures obtained from texture interpolation across oblique polygon faces rather than the more accurate textures, which may lie behind the polygon.

Noticeable artifacts may result when polygons are combined from multiple views into a single rendered image since merged polygons (e.g., triangles) may not merge seamlessly to form a continuous surface. As such, polygons from different views may appear to be disconnected.

As the complexity of features collected by a texel data source increases, coherence (i.e., connectivity between points) may tend to decrease. It is well known in the art that when the number of polygons in an object exceeds the number of pixels on a human viewable display, the polygon connectivity becomes almost useless to the rendering process.

One approach to addressing the problems inherent in mapping large, detailed texel point cloud data sets to polygons for rendering is to simply use points that are not connected. The use of unconnected graphic entities and rendering techniques that do not rely on texture-mapped polygon networks may significantly increase the amount of data that can be rendered and speed up the rendering processes. Further, the use of a hybrid rendering system incorporating polygons and point primitives may allow the rendering system to simplify a point cloud where possible and efficient to do so (e.g., through the use of polygons) while avoiding problems inherent in an all-polygon approach.

Texel data can be represented by a variety of relatively simple graphic primitives that describe not only the LIDAR shot location (e.g., x, y, z cords), but also a texture patch associated with it. These primitives may have only local connectivity (e.g., local meshes, textures, or point clusters) and are sometimes referred to as "static imposters" in that they may substitute for the more detailed, and hence, more computationally burdensome, textured polygons, such as triangles. The lack of connectivity associated with these primitives may have advantages over polygon networks where well-defined surfaces do not exist (e.g., as with trees).

Whenever the TTC texture patch includes only one texel (i.e., the texel-to-shot ratio is nearly 1:1), the rendering of a point cloud using point primitives may be more efficient than rendering the patch using textured points or a textured polygon network. Point primitives may be used to render point cloud data, such as "simple points" and/or "splats."

A "simple point" may be used to render complex surfaces by mapping a point to one or more pixels on a display. A simple point may be described by a seven (7)-tuple: (x, y, z, r, g, b, a), where "x," "y," and "z" may refer to the point position relative to the TTC camera, or some other reference point the "r," "g," and "b" values may define a point color and the "a" value may be an alpha component used for blending adjacent points. Additional attributes may be used including depth, object space normal, specular color, and shininess. Data acquisition using a TTC may only supply the x, y, and z coordinates and a group of r, g, and b values. The other parameters may be computed in one or more pre-processing steps. For instance, a point normal may be determined using a variety of neighborhood evaluation methods, some of which are discussed below.

A "splat" may refer to a point primitive capable of mapping a single point to multiple pixels on a display at rendering time. The color of a particular pixel may be a weighted average of the colors of the other points contributing to the pixel. In addition to the attributes associated with a simple point, a splat data structure may comprise a circular radius, or alternatively, circular radii. As such, each splat may represent an object-space disk. In addition, an elliptical splat structure may include two tangential axes to orient the ellipse in space. According to the principles of differential geometry, a properly oriented ellipse may be an excellent linear approximant to a smooth surface and may replace a large number of simple points while being just as accurate. As such, for rendering a surface with a minimal number of entities, splat-based representations may be superior to polygon networks and simple point clouds. Like simple points, splats may have only one color and may not be textured.

TTC data may typically have a texel-to-shot ratio of greater than 1:1. As such, the point primitives discussed above, may not be ideal, unless: (1) the point cloud density is artificially increased to preserve texture detail; or (2) some of the color detail of the point cloud is discarded. Of course, if the Texel Camera is operated in a way where the ratio approaches 1:1, then the use of point primitives is preferred for reasons of graphics speed and efficiency. Otherwise, the number of textured point primitives in the rendering model may need to be multiplied by the texel-to-shot ratio to achieve the desired color and texture fidelity.

Besides simple points, TTC data may be represented by a variety of relatively simple graphical primitives that express not only the LIDAR shot location, but also a texture patch associated with it. These so-called textured point primitives may have only local connectivity (e.g., local meshes, textures, or point clusters) and may be referred to as "static imposters." Textured point primitives may include "textured quadrilaterals" (textured quads), "textured splats," "billboards," and "billboard cloud imposters." Generically, these entities may be referred to as "textured points." Textured points may substitute for more detailed, and hence more computationally burdensome, textured polygons, such as triangles. The lack of connectivity associated with textured points may provide some advantages over polygon networks where well-defined surfaces do not exist (e.g., a tree, bush, or the like).

A textured quad may comprise four (4), texture-mapped 3D vertices, and may be used to represent an image of an object or scene from a particular point of view. A textured quad may have a fixed surface normal, which may affect rendering of the quad depending upon a particular point of view. If the image represents more than one object, this primitive may be referred to as a textured cluster. Image patches associated with individual LIDAR shots in the Texel Camera are, in essence, textured quads where the surface normal is directed toward the camera.

A textured splat may comprise an "ordinary splat" (as described above) that has one or more texture maps attached thereto. Textured splats may be similar to the textured quads mentioned above, except that its texture information may be more detailed. In addition, an alpha blending map may be associated with a plurality of textured splats. The alpha map may be combined with the texture data to create a smooth transition between adjacent splats. Textured splats may be used to represent complex TTC data since they have texture data that could be used to represent complex objects, such as leaves and trees quite well, while at the same time being capable of representing smooth surfaces, such as pipes and walls.

A "billboard" may refer to a textured quad that is made to rotate in such a way that the surface normal is always directed toward the observer. As such, a billboard may not comprise a fixed surface normal and may be referred to as a "3D sprite," (i.e., a sprite that is used in a 3D environment). In some billboard implementations, a series of billboards may come into and out of view according to the viewpoint as an observer moves around the object.

"Billboard cloud imposters" may be built by simplifying a textured triangle model into a set of oriented quads with texture and transparency maps. During rendering, a good surface approximation may be improved by favoring quads that are oriented nearly tangent to the model. No connectivity information is required, and cracks between billboards may be avoided by projecting entities into multiple planes. This technique may be capable of rendering a large variety of model shapes.

All of the above graphic entities are very closely related in that they represent one point in space and an associated texture. The way they are manipulated and rendered is what distinguishes them. As such, as used herein, they may be referred to generically as "texture points."

As a further development to static imposters, so-called "dynamic imposters" describe a technique using a hierarchical tree of textured quads where the displayed textures and vertex coordinates are updated dynamically and visual artifacts are minimized using an error metric. The updating is carried out by traversing a hierarchical tree and loading graphic entities from the appropriate nodes given the current viewpoint.

The above-described textured points may be useful in rendering Texel Camera imagery data. For instance, the Texel Camera may produce a point/texture doublet that can, given the knowledge of the position of surrounding points, be made into a textured point (i.e., a point describing a location and texture associated with that location). Each patch of acquired texels may have its center at the location of the LIDAR shot and have a perspective normal pointing toward the camera.

As discussed above, some textured point primitives are described, in part, by a surface normal. A surface normal for a particular point may be calculated using neighboring LIDAR shots (calculation of surface normal is described in more detail below). Transparency (alpha) values associated with texels may be computed at render time. Alpha values can be used to make parts of the texel patch disappear, such as a ribbon of sky beyond the reach of the LIDAR. Using textured points, the topological and segmentation errors associated with an intermediate triangulation step may be avoided.

After a textured point cloud is collected (e.g., with a TTC), but prior to rendering, the point cloud may be pre-processed. The pre-processing step(s) may enable high fidelity, high-speed rendering. The pre-processed texel imagery data may be stored in an intermediate format (i.e., not as raw point cloud data). A renderer may access the pre-processed texel imagery data.

Turning now to FIG. 1, a flow diagram of a method 100 for pre-processing texel camera generated point cloud data sets for efficient and accurate rendering is depicted.

At step 110, one or more point cloud data sets may be received. As discussed above, the point cloud data sets received at step 110 may be generated from a LIDAR imaging system, such as a TTC, and may comprise point cloud data taken from one or more points of view (i.e., LIDAR imaging positions). Accordingly, at step 115, point cloud data sets from these multiple points of view may be merged together into a single point cloud data set using a global transformation.

At step 120, method 100 may stream through the merged dataset of step 115 to construct an octree hierarchy therefrom. An octree hierarchy constructed at step 120 may partition the scene captured in the point cloud data into increasingly smaller (i.e., more highly detailed) volumes.

One such hierarchical point-based level of detail (LOD) data structure uses a 3D binary voxel grid to create an octree data structure as described below in conjunction with FIG. 2. In this approach, each non-empty node in the hierarchical octree may have a center position which is used as a sample point (texel points have been omitted from the of FIG. 2a-c for clarity). The point cloud data may be recursively sub-sampled and pruned (e.g., using zero-tree pruning). Recursively sub-sampling the regular grid and applying zero-tree pruning may result in an adaptive LOD octree structure since the tree is populated only where detail is present. This process may produce a compact LOD representation that requires less than two (2) bits per point primitive (e.g., splat) position. Normal vector and color (e.g., r, g, b values) may be stored separately. The reconstruction algorithm may consist of a non-recursive tree traversal controlled by a sequence of byte codes.

Figure 2A:
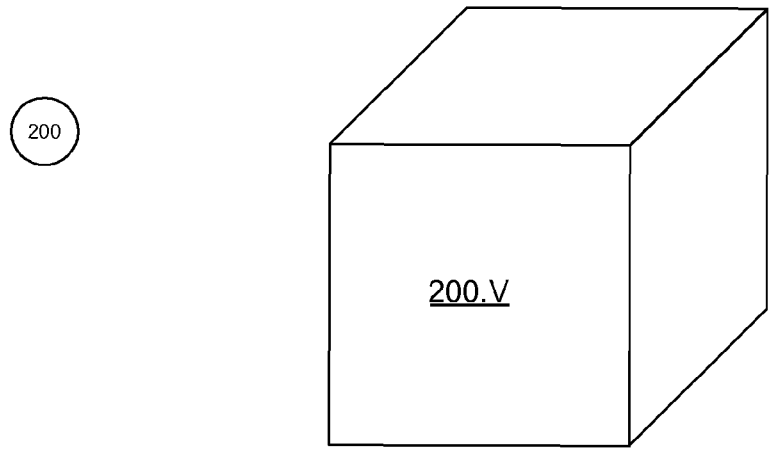
FIG. 2 is a block diagram of one embodiment of a hierarchical octree data structure.

Turning to FIG. 2a, one embodiment of an octree hierarchy is depicted. A tree structure (e.g., top-level node 200) may be used to describe the spatial relationships depicted in FIGS. 2b-c. In FIG. 2a, a volume 200.V is depicted at a very high-level of granularity (e.g., low level of detail). For instance, volume 200.V may correspond to an entire 3D scene. As such, 3D volume 200.V may be represented by a top-level node 200 in an octree data structure.

Figure 2B:
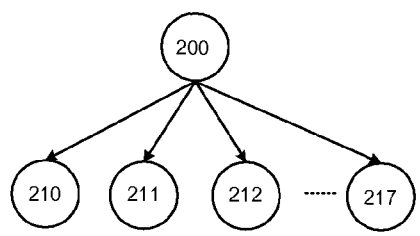
Figure 2B:
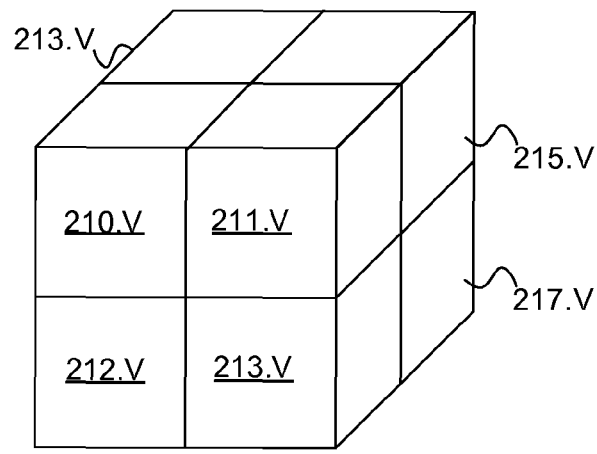

Turning to FIG. 2b, the 3D scene represented by 200.V may be partitioned into eight (8) substantially equally sized octants, 210.V-217.V. Each octant 210.V-217.V may comprise additional detail about object depicted in scene 200.V. The octree hierarchy may reflect this volume subdivision by generating eight (8) child nodes (nodes 210-217) under root node 200. Each node 210-217 may correspond to a volume 210.V-217.V.

Figure 2C:
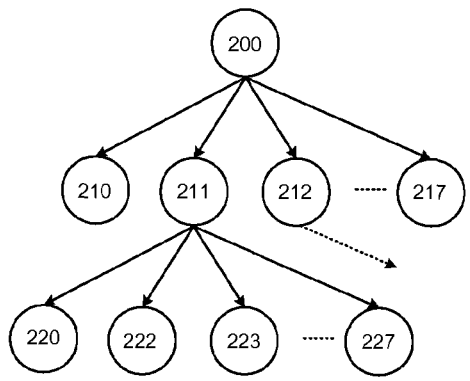
Figure 2C:
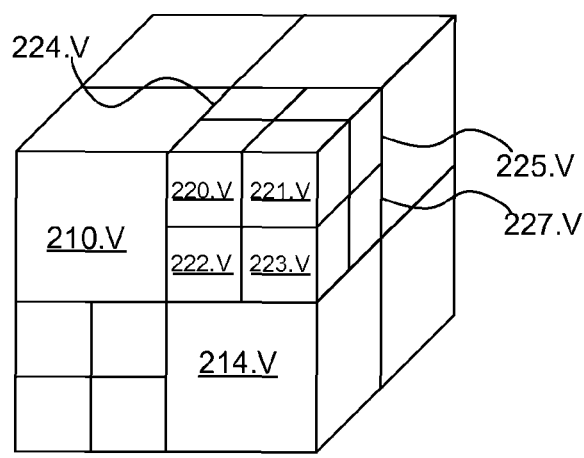

FIG. 2c depicts a further partitioning of the scene 200.V. As the scene 200.V is further partitioned, the space may be recursively split into octants (e.g., each child node 210 through 218 may have eight (8) respective child nodes). FIG. 2c shows child node 211 and 212 partitioned into eight (8)

child octants. For instance, node 211 is divided into child nodes 220 through 227. These nodes may correspond to volumes 220.V through 227.V. As is shown in FIGS. 2*a-c*, each level in the hierarchy may comprise additional detail about the scene of volume 200. Hence, an octree structure may be used to create a LOD tree describing a scene 200.V. Volume 200 may be recursively split as many times as necessary to obtain a desired level of granularity or a leaf node is reached (i.e., a node having no children). A leaf node may be created when only a small number of points are left in the node (i.e., there are fewer than a threshold number of points in the node).

Referring again to FIG. 1, at step 125, a level-of-detail (LOD) representation for each leaf node in the octree hierarchy may be created. As used herein, a leaf node may refer to a tree node having no sub-tree child nodes (e.g., in an octree, a node where there is no further partitioning possible). The LOD representation of a node may comprise a specific projection error tolerance 'ε' for the node that governs simplification. The projection error tolerance ε may correspond to a constant fraction of the ideal screen size of the node; for example, a screen size of 32 pixels and a projection error tolerance ε of 0.5 pixels.

At step 130, a res×res×res grid of cells within each leaf node may be defined. The points within each cell may be simplified using vertex clustering in each grid where $$res = \frac{S_{scr}}{\varepsilon}.$$

For instance, a res of 32 and tolerance ε of 0.5 pixels may be used.

At step 135, the planes within the point cloud data may be determined. This may be done using a number of different approaches and/or techniques, such as a Random Sample Consensus (RANSAC) approach.

In the RANSAC method, parameters representing a surface normal to the points in the point cloud data set may be computed from a number of samples. Then all the samples may "vote" to determine an overall plane representation and corresponding normal. As such, in RANSAC, first a plane candidate may be chosen by randomly taking three (3) point samples from the point cloud. Next, the so-called consensus of the candidate plane may be measured; this consensus may be measured as an error metric between constituent points and the proposed plane. Next, the method may iterate until a suitable plane (based on an error metric) is found and/or a maximum number of iterations have been performed. If the consensus on the best candidate plane is high enough (e.g., the cumulative error for each point is below a threshold), the plane may be detected.

Although step 135 is described as using a RANSAC approach to detecting planes within the point cloud data, one skilled in the art would recognize that any other plane detection technique and/or approach could be used under the teachings of this disclosure. As such, this disclosure should not be read as limited to any particular plane detection technique.

At step 140, each plane detected at step 135 may be compared to a compactness metric threshold. If the plane is "too small" at step 140, it may be rejected and replaced with its constituent points. The plane may be considered "too small" if it would be faster to render the original points rather than the plane. For example, a compactness criterion of t<$\vartheta$(v−4), where t is the number of texels of the polygon (i.e., the size of the plane), v is number of points replaced by the plane, and $\vartheta$ is the ratio of texel rendering time to polygon rendering time (e.g., eight (8)) may be used. If the plane is too small per the criterion of step 140, the flow may continue to step 145; otherwise, the flow may continue to step 155.

At step 145, the plane may be rejected, and the points associated therewith may be rendered as point primitives. Accordingly, in the pre-processing model generated by method 100, a point primitive rather than a plane may be used to represent the points.

At step 150, the position of the remaining points, those points not simplified into planes per steps 135, 140, may be quantized to a cell grid within leaf nodes of the hierarchy. This may require six (6) bits in each dimension of a 64×64×64 node-bounding box.

At step 155, a textured quadrilateral may be generated for the plane detected at step 135. At step 160, a texture may be applied to the textured quad. The texture of step 160 may be generated by rendering a portion of the point cloud in the current LOD node to include all points within the error threshold ε. The texture resolution may be chosen such that the distance between any two texels is approximately the error threshold ε of the corresponding level of the LOD tree. The flow may then continue to step 185.

At step 170, the LOD tree may be traversed to higher levels of the tree (i.e. nodes having a lower level of detail). In each tree cell, if the texel-to-shot ratio is greater than four (4) to one (1), the flow may continue to step 175; otherwise, the flow may continue to step 180.

At step 175, a composite texture and composite quad representing the cell may be generated as described above in conjunction with step 160.

At step 180, a splat representing one or more points in the cell may be generated. The splat may comprise a texture having a single composite color based on the color(s) of its constituent point(s).

At step 185, given the quadrilaterals and splats created for each leaf node of the octree hierarchy, lower LOD textured quads for the higher nodes in the tree may be generated (e.g., with larger a error threshold 'ε' corresponding to a lower level of detail). The octree may be stored in a file and/or other data storage location. As discussed above in conjunction with FIG. 2*a-c*, the octree may be stored as a sequential list of nodes by traversing the octree data structure in breadth-first order.

At step 190, textures for each node may be stored. For each set of nodes with the same grandparent, all of the quadrilateral textures may be packed into a texture atlas and saved as separate image files (e.g., in TIFF format with Huffman compression). The use of a separate file for each grandparent may facilitate out-of-core rendering efficiency.

Figure 3:
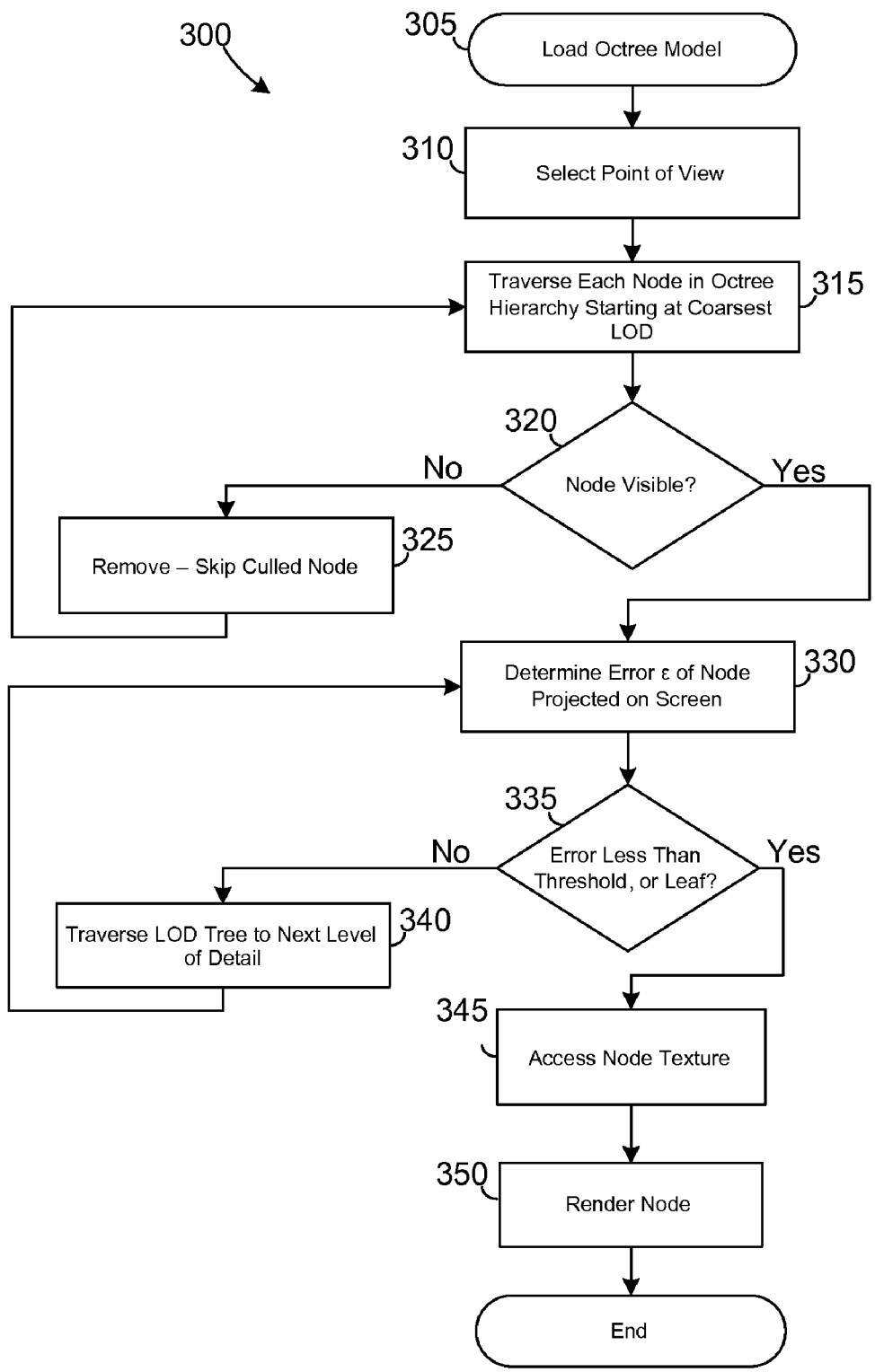
FIG. 3 is a flow diagram of one embodiment of a method for rendering texel imagery data.

Turning now to FIG. 3, a flow diagram of one embodiment of a method 300 for rendering pre-processed texel imagery data is depicted.

At step 305, the octree data structure associated with the model (e.g., the data structure stored at step 185 in method 100) may be loaded. Such loading may comprise reading a machine-readable storage media comprising the data and/or transferring the machine-readable data into volatile and/or non-volatile memory for access by method 300.

At step 310, a viewpoint (i.e., point of view from which model is to be rendered) may be selected. At step 315, the hierarchical LOD octree structure loaded at step 305 may be traversed starting at the coarsest level of detail node(s) in the octree hierarchy.

At step 320, each node visited by the traversal of step 315 may be checked for visibility. The visibility check of step 320 may comprise frustum culling to determine whether the checked node is visible given the point of view selected at step 310. If the determining of step 320 indicates that the node is not visible, the flow may continue at step 325; otherwise, the flow may continue to step 330.

At step 325, the node may be removed and/or culled form the rendering process 300. Additionally, the node sub-tree, including all child nodes of the culled node (e.g., more detailed and/or finely grained nodes) may be removed. The sub-tree may be removed since any child nodes will not be visible if the parent node is not visible. After removing/culling the node(s), the flow may return to 315 where the rest of the nodes in the octree may be checked.

At step 330, a visible node may be processed and rendered. At step 330, an error value ϵ for the node may be determined. The error value ϵ may correspond to an error projected onto the screen by the node (e.g., when rendered).

At step 335, the error ϵ calculated at step 330 may be compared to an error threshold. In one embodiment, the error threshold may be ½ pixels. If the projected error ϵ is either below the error threshold or the node is a leaf node (i.e., has no higher LOD children nodes), the flow may continue to step 345; otherwise, the flow may continue to step 340.

At step 340, the LOD tree may be traversed to the next level of detail (i.e., the next higher level of detail). After so traversing, the flow may continue to step 330, where the new node's error and leaf status may be evaluated. As such, the LOD tree may be recursively traversed until a suitable LOD and/or a leaf node is reached.

At step 345, a texture associated with the node may be accessed. As discussed above, texture information (e.g., texture file and/or texture atlas) may be stored in a separate file and/or storage location. In such an embodiment, at step 345, the texture file and/or atlas corresponding to the node to be rendered may be obtained and the texture information may be loaded into volatile memory, non-volatile memory, or otherwise made available to method 300.

At step 350, the node, with its associated texture data, may be rendered. Where the node comprises a plane, it may be rendered as a textured quad. Where the node comprises one or more point(s), such points may be rendered as a textured splat, composite splat, and/or textured quad.

Although the pre-processing and rendering approach described in FIGS. 1 and 3 may be effective at rendering point cloud data, it may be problematic in that the octree file size may become excessively large (e.g., the size of the octree may quadruple in models comprising a large number of textured quads). As such, rendering speed may suffer.

In an alternative approach, textured quads (e.g., primitives having 4 point vertexes) may be replaced by textured spats, which are point primitives that may require only one point per primitive. This may avoid quadrupling the octree size and, as such, may increase rendering performance.

Figure 4:
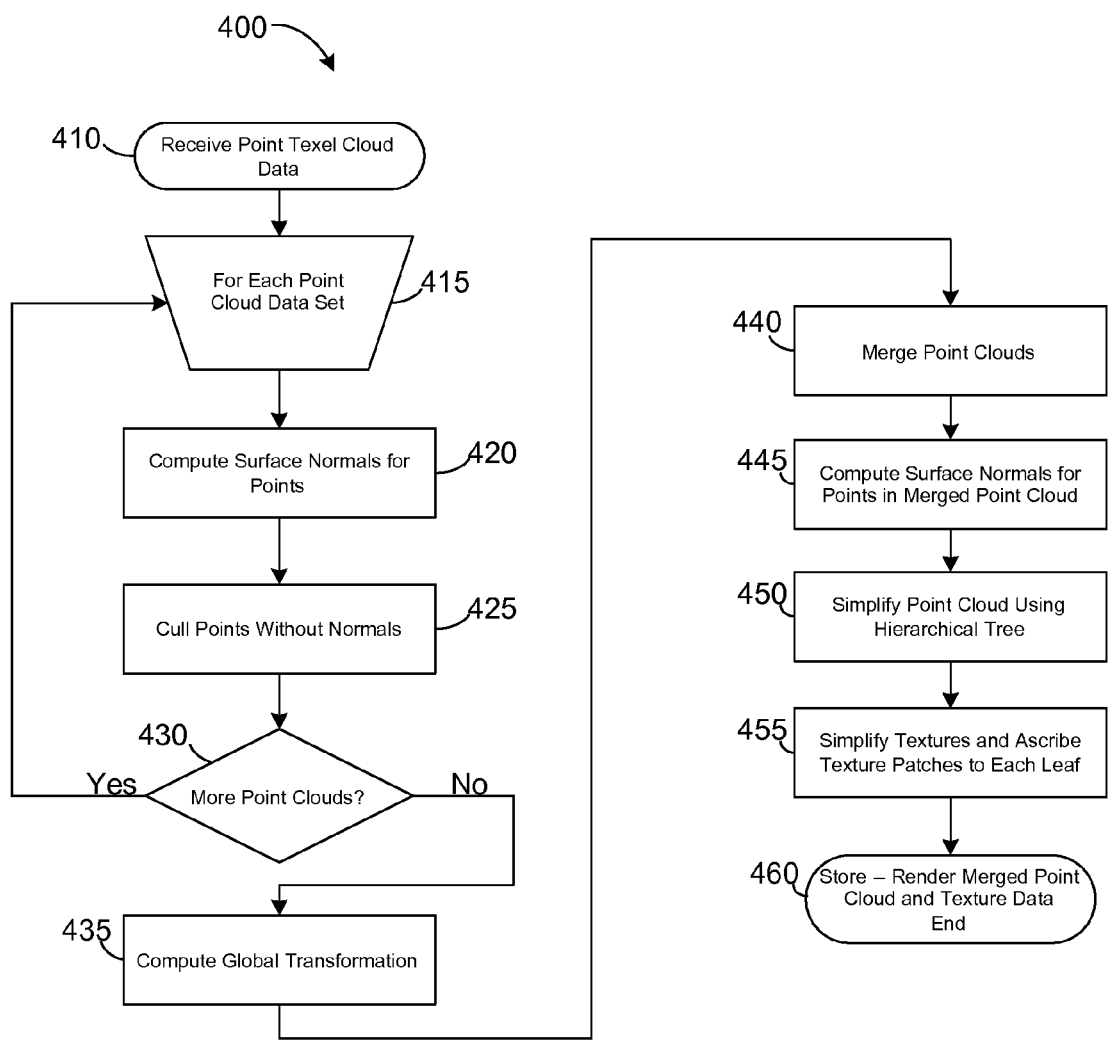
FIG. 4 is a flow diagram of one embodiment of a method for pre-processing a plurality of texel imagery data sets.

Turning to FIG. 4, a flow diagram depicts one embodiment of a method 400 for pre-processing texel data for rendering. The pre-processing and rendering method 400 described in FIGS. 4 and 6 may use billboards rather than colored squares, circles, or Gaussians.

The use of billboards, as opposed to the entities used in other systems and methods, may reduce the memory requirements of the model. For instance, since a billboard is a "sprite," it may not be oriented in space and, as such, may not require four quadrilateral vertices for each point. Similarly, a textured splat may require only position and normal data. Accordingly, the use of billboards and textured spats may avoid quadrupling the octree file size and corresponding memory footprint.

At rendering time, the shape of a billboard primitive may be varied depending on its surface normal relative to the viewing plane. Where a scene contains non-surfaces (e.g., tree objects), this feature may be disabled.

In one embodiment, the radius of textured spat and/or billboard primitives (e.g., bounding spheres discussed below) may be limited to the radius of the LIDAR footprint used to generate the point cloud data. When so limited, the resulting rendering may provide an accurate visual impression of LIDAR data coverage. This limit may ensure splat overlap on surfaces wholly acquired by the texel camera, but would allow holes to appear in occluded areas within a cluttered object or where the point cloud data set coverage is sparse.

At step 410, process 400 may receive one or more sets of texel point cloud data. The data sets may also come from other devices that combine point cloud data with texture data. Multiple data sets may be received where a texel camera is used to capture an object and/or scene multiple times from various perspectives and/or points of view.

At step 415, each point cloud data set may be processed individually over steps 420 and 425. At step 420, surface normals for the points within a point cloud data set may be determined. As discussed above, there are a number of different techniques and/or methodologies that could be used to determine point normals at step 420 including, but not limited to: k-nearest neighborhood sampling, k-nearest neighborhood covariance, RANSAC (discussed above), or the like. Under a k-nearest neighborhood eigenvector approach, a surface normal may be estimated by first determining a set of k points proximate to a point of interest and/or point cluster (i.e., the point whose normal is to be estimated). This neighborhood may be referred to as $N(x_i)$ and a point therein may be referred to as $x_i$ where $x_i \in N(x_i)$. The normal may then be computed by forming a covariance matrix of $N(x_i)$ as shown in Equation 1.1:

$$CV = \sum_{y \in N(x_i)} (y - o_i) \otimes (y - o_i) \qquad \text{Eq. 1.1}$$

In Equation 1.1, $\otimes$ may represent an outer product vector operator and $o_i$ may denote a centroid value of $N(x_i)$ (a centroid for a neighborhood of points may be the average of all of the points included in the neighborhood $N(x_i)$). The eignvalues of CV may be calculated and associated with their corresponding eigenvectors. The normal may be selected as the unit eigenvector vector corresponding to the smallest eigenvalue of CV.

Although step 420 is described as using an eigenvector based point normal estimation technique, one skilled in the art would recognize that any normal calculation/estimation technique could be used under the teachings of this disclosure. As such, this disclosure should not be read as limited to any particular normal calculation/estimation technique.

At step 425, points not having a normal (e.g., not within a suitable k-neighborhood), may be culled from the analysis of step 435 (merging of the various point clouds).

At step 430, method 400 may determine whether there remain any point cloud data sets that have not been processed per steps 420 and 425. Any remaining point cloud data sets may be processed as the flow continues to step 415 where the next point cloud data set may be processed; otherwise, the flow may continue to step 435.

At step 435, a global transformation may be calculated to allow the plurality of point cloud data sets to be merged into a single point cloud data set. There are a number of techniques and/or approaches available to generate such a global transformation. For example, an Iterative Closest Point (ICP)

plane-plane and/or point-point algorithm may be used to determine the global transformation function. Under this approach, to translate points and/or planes into a single coordinate system, each point cloud data set may require a translation parameter and a rotation parameter. A translation parameter may be used to move and/or shift individual points relative to one another, and a rotation parameter may be used to rotate points and/or planes to conform relative to one another. These parameters may allow a plurality of point cloud data sets to be mapped to a global (or otherwise common) coordinate system.

In an ICP approach, determining the translation and rotation ICP parameters may comprise: 1) associating points by a k-nearest neighbor criteria (as discussed above in conjunction with normal estimation and space partitioning); 2) estimating translation and rotation parameters using a cost function (e.g., mean square cost); 3) transforming the points using the estimated parameters; 4) determining an error/cost of the translation; and 5) iterating over steps 1-4 until the error reaches an acceptable threshold level.

Although step 435 is described as using an ICP approach, one skilled in the art would recognize that the teachings of this disclosure could be carried out using any global transformation determination technique and/or methodology known in the art. As such, this disclosure should not be read as limited to any particular global transformation determination technique and/or methodology.

At step 440, the point clouds may be merged into a single point cloud data set using the global transform determined at step 435. As such, one or more point cloud data sets may be translated and/or rotated according to the global transform of step 435.

At step 445, surface normals for the points in the merged point cloud may be calculated. The normals may be calculated as described above in conjunction with step 420. The calculation of step 445 may result in more accurate surface normals that those calculated at step 420. This is because, when the point cloud is merged, the merged point cloud may be more dense, resulting in a better formed k-neighborhoods for individual points. This increased detail may allow point normals to be estimated to a higher-degree of accuracy than those obtained at step 420 where only a portion of the point cloud data was used.

At step 450, the merged point cloud may be simplified using a clustering, iterative simplification, particle simulation, or other surface and/or point cloud simplification technique. Under the this approach, the point cloud "P" may be split if either: 1) the size of the point cloud is larger than a user-specified maximum cluster size, $|P|>n_{MAX}$; or 2) the point cloud variation is above a maximum threshold, $\sigma_n(P) > \sigma_{max}$. The point cloud variation may be determined by calculating a centroid value of the point cloud and applying a variation metric, such as Equation 1.3:

$$\sigma_n = \sqrt{\frac{1}{N} \sum_{x \in P} (x_i - c)^2} \qquad \text{Eq. 1.3}$$

In Equation 1.X, $\sigma_n$ is the variance of a set (i.e., neighborhood) comprising N points, c is the centroid of the neighborhood, and $x_i$ is a point in the set P.

The point set P may be split along a split plane defined by, inter alia, a covariance matrix of the point set. As discussed above, the covariance matrix for a point set P (i.e., neighborhood and/or cluster) may be expressed as:

$$CV = \sum_{y \in N(x_i)} (y - o_i) \otimes (y - o_i) \qquad \text{Eq. 1.4}$$

Again, in Equation 1.4, c may represent the centroid of the point set and y may represent an element of the point set $N(x_i)$. The split plane may be defined by an eigenvector of CV, $v_{split}$. Vector $v_{split}$ may be selected as the eigenvector of the covariance matrix CV corresponding to the largest eigenvalue of CV. As such, the point set P may be split along its axis of greatest variance. This method of cluster splitting may be preferred since a covariance matrix associated with each point may have been calculated to determine the point normal per Equation 1.1. As described above, a point normal may be estimated at steps 420 and 445 of FIG. 4 by calculating a covariance matrix (CV) of a point's k-neighborhood and selecting as the point normal as the eigenvector of the CV corresponding to the smallest eigenvalue.

The resulting hierarchy may be stored in a serializable tree data structure. One such data structure is depicted in FIGS. 5a-5c.

Figure 5A:
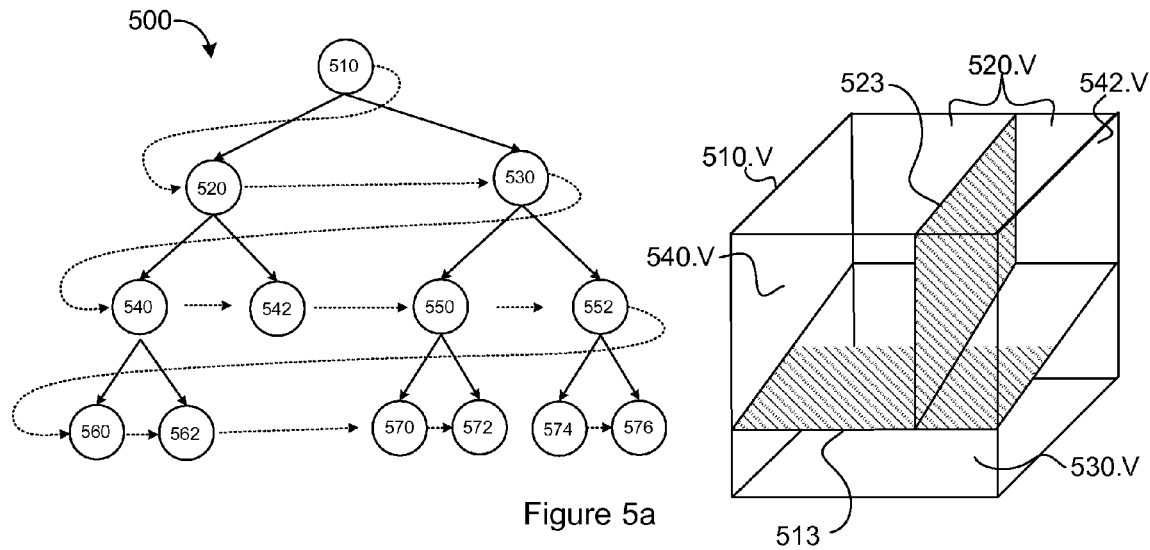
FIG. 5 is a block diagram of one embodiment of a hierarchical level of detail (LOD) tree data structure.
Figure 5B:
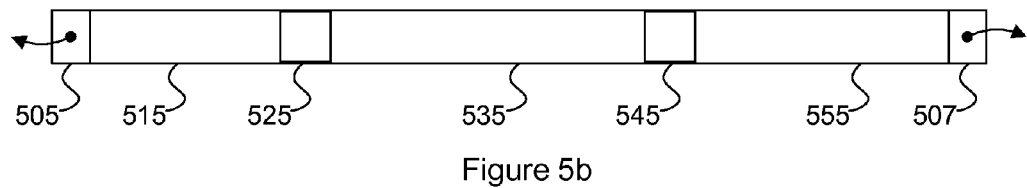
Figure 5C:
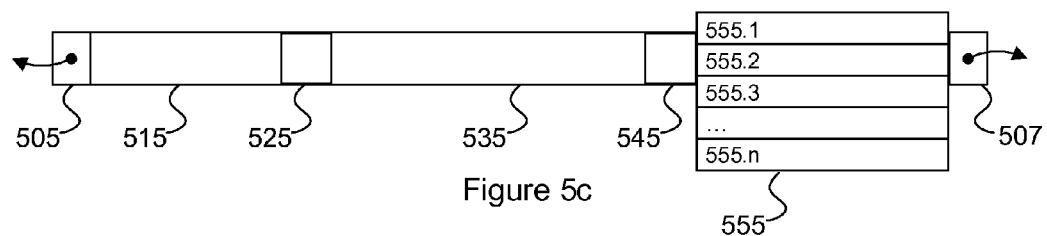

Turning now to FIG. 5a, node 510 may represent the top-level tree node. As such, tree node 510 may represent a scene volume 510.V (texel points have been omitted from volume 510 for clarity). Child nodes 520 and 530 may represent a left and right sub-tree respectively created by partitioning volume 510.V by a splitting plane 513 into sub-volumes 520.V and 530.V. Splitting plane 513 may be determined according to the algorithm described above (e.g., covariance, maximum eigenvector approach).

Volume 520.V may be further partitioned by splitting plane 523. This may cause volume 520 (defined as the upper bound of 510.V and lower bound of plane 513) to be portioned into volumes 540.V and 542.V. Volumes 540.V and 542.V may be represented in the tree structure as nodes 540 and 542. As described above, volume 510 may be further partitioned until a size and/or error threshold is reached. For example, volume 530.V may be partitioned into sub-volumes (not shown) represented nodes 550, 552, and so on. This processes until each leaf node contains one point.

The tree structure 500 of FIG. 5a may be stored in a machine readable storage location in breadth-first order. This ordering is depicted by the dashed lines connecting tree nodes (e.g., 510, 520, and 530) in FIG. 5a. Under a breadth-first ordering, node 510 may be stored, followed by 520, 530, 540, 542, 550, 552, 560, 570, 572, 574, 576, and so on.

Turning now to FIG. 5b, one embodiment of a serialized data structure for a tree node of FIG. 5a is depicted. Each node in the tree structure of FIG. 5a may comprise several pieces of data. Link 505 may comprise a pointer, or other referencing means, to the node's parent (e.g. element 505 of node 520 may point to node 510). The position and bounding sphere radius of the node may comprise 13 bits of data and may be stored in location 515. The tree structure may comprise 2-3 bits and be stored in position 525. The point normal may comprise 14 bits and may be stored in location 535. The width of the normal node may comprise 2 bits and be stored in location 545. A simple node texture (e.g., an r, b, g color) may be stored at location 555. Finally, links to child nodes (if any) may be stored in location 557.

Turning now to FIG. 5c, one embodiment of a modified serialized data structure for a tree node of FIG. 5a is depicted. In the FIG. 5c embodiment, each tree node may comprise a plurality of color data entries 555 (i.e., 555.1 through 555.n). Entries 555 may replace the single entry 555 for texture data provided in the data structure of FIG. 5b (i.e., element 555 of FIG. 5*b*). The textures of 555.1 through 555.*n* may comprise sixteen (16)-bit color values to provide a splat texture beginning at a top left of the splat (represented by the node) and progressing row-wise to a bottom right of the splat. A renderer may handle these textures 555.1 through 555.*n* in the same way sprites are handled. The sprite may optionally be Gaussian filtered in the same way that ordinary splats are handled.

Although a particular serialized layout and corresponding data field widths are provided in FIGS. 5*b* and 5*c*, one skilled in the art would recognize that any number of different data layouts and/or sizes could be used under the teachings of this disclosure. As such, this disclosure should not be read as limited to any particular tree, data structure, and/or data layout technique and/or methodology.

Referring again to the flow diagram of FIG. 4, the space partitions generated at step 450 may comprise a LOD tree therein. Each space partition may have an associated bounding sphere. The LOD structure may, therefore, be based upon a bounding sphere hierarchy. In this approach, the size of leaf node spheres may be determined as the size of the LIDAR footprint. This may allow the resulting LOD model to accurately depict data coverage of the system. Alternatively, the spheres may be set larger to avoid rendering holes in the model. After determining the size of the leaf nodes, the bounding sphere hierarchy may be recursively built up from larger (lower LOD) bounding sphere primitives.

In another embodiment, a more accurate but less compact LOD tree may be constructed by computing surface normals for each point in the data set (using, for example, a k-nearest neighborhood approach or the like). The LOD tree may be constructed by determining a bounding sphere for a top-level point cluster. The bounding sphere may be determined by the proximity of surrounding points. This top-level sphere may be split into two child spheres along the longest sphere axis. The LOD tree may be built by recursively splitting the resulting bounding spheres. The child bounding spheres may be determined based on the proximity of the surrounding points as described above, and the recursively continue until a sphere containing a single point is reached. The point may be represented as a sphere having a center at the position of the point.

The radius and position of each sphere may be simplified by quantizing it relative to a parent bounding sphere. For example, the position of a child sphere may be quantized to one of "n" (e.g., 13) possible values ranging from 1/n to n/n of the radius of the parent sphere, placing the center of the sphere to a multiple of 1/n of the diameter of the parent sphere, and, if the node comprises points having a normal, the normal may be similarly quantized. This quantization may be performed from the top down, to avoid propagating quantization error.

At step 455, each node in the LOD structure may have a texture patch ascribed thereto. For lower LOD nodes, the texture patch may be simplified to reflect texture information of points comprising the node. For example, where the texture ascribed to such a node may be a combination of the color and normal of the corresponding simplified points. The texture data may comprise an alpha blending component to smooth transitions between adjacent splats. This texture data may be stored in the tree node as described above (elements 555.1 through 555.*n* in FIG. 5*c*).

At step 460, each node in the hierarchical data structure generated at step 450 may be stored in a file and/or network accessible storage location. As discussed above, the hierarchical tree may be serialized using a breadth-first traversal of the tree. The serialized data stream may be stored in a file and/or some other data storage system (e.g., database, or the like). The textures ascribed to each leaf node in the tree may be stored in line with the tree (e.g., as part of the serialized tree data structure) and/or may be stored in a separate texture file and/or atlas as described above.

Figure 6:
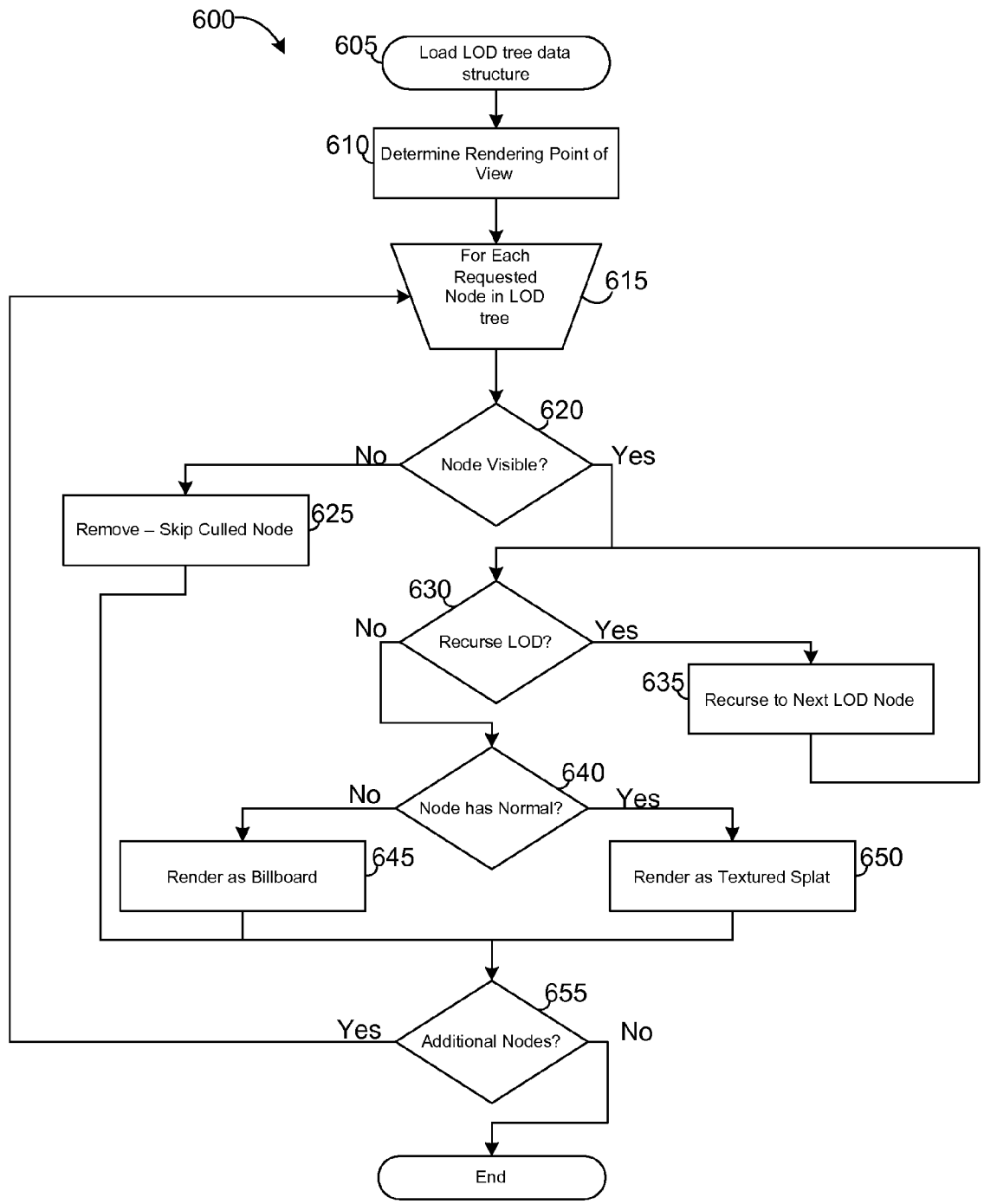
FIG. 6 is a flow diagram of one embodiment of a method for rendering texel imagery data.

Turning now to FIG. 6, a method 600 for rendering texel data is depicted. The data rendered by method 600 may correspond to data pre-processed using the pre-processing method described above in conjunction with FIG. 5.

At step 605, a LOD tree hierarchy data structure may obtained. At step 605, the entire tree may not be loaded; instead, rendering method 600 may stream through the tree data structure. As such, loading a tree hierarchy at step 605 may comprise obtaining a handle to a network resource (e.g., a uniform resource locator (URL) or the like).

At step 610, the point of view from which to render the model may be determined. The point of view of step 610 may determine which nodes of the tree hierarchy referenced at step 605 may be requested.

At step 615, each node requested from the tree may be evaluated for visibility (step 620) and rendered (steps 630-640). At step 620, method 600 may determine whether the node is visible. This may be done, as described above, using frustum culling. If the node is not visible, the flow may continue to step 625; otherwise, the flow may continue to step 630.

At step 625, the node (and its sub-tree) may be skipped or otherwise culled from rendering process 600. This may comprise instructing a network loader not to request the node nor any texture data associated with the node. A sub-tree comprising child nodes (e.g., nodes representing a higher LOD) of the current node may be similarly skipped or otherwise culled from the analysis. After culling the node, the flow may continue to step 655.

At step 630, a determination may be made as to whether the LOD tree should be traversed to a higher level of detail node. This may be done by comparing the projected screen size of the node to an error threshold. For example, the hierarchy may be traversed to a higher LOD if the size of the sphere when projected onto the screen exceeds a threshold. If the determination is positive (e.g., the sphere size on the screen exceeds the threshold), the flow may continue to step 635; otherwise, the flow may continue to step 640.

At step 635, the LOD tree may be traversed to the next higher LOD in the hierarchy. The flow may then continue to step 630 where the node may be evaluated.

At steps 640-650, the node may be rendered. At step 640, process 600 may determine whether the node has a normal. If not, the flow may continue to step 645; otherwise, the flow may continue to step 650.

At step 645, the node may be rendered as a billboard. As discussed above, a billboard entity may not require a normal since it may always appear to be facing the observer (e.g., normal is opposite the point of view). However, it may be rotated and/or occluded from view (e.g., culled at step 625) depending upon the point of view selected at step 610.

At step 650, the node may be rendered as a textured splat. In one embodiment, the textured splat may be given a circular and/or elliptical radius corresponding to the radius of its bounding sphere. This may avoid showing gaps in the model (even if such gaps exist in point cloud data set). Alternatively, the radius of the splat may be limited to the LIDAR footprint and/or the LIDAR footprint of the points comprising the bounding sphere. In this embodiment, the resulting rendering may show gaps due to insufficient data coverage. Visually depicting such gaps may be useful in determining whether the LIDAR data coverage is sufficient and/or visualizing the area actually captured by a LIDAR imaging system.

At step 655, process 600 may determine whether there are additional nodes to render. If so, the flow may continue to step 615 where the next node may be rendered. If no nodes remain to be rendered, the flow may terminate.

In an alternative approach, method 600 may be used to render a model as a stream. During rendering, the recursive descent of the LOD tree at steps 630 through 635 may be terminated if: 1) the children of the node are smaller than an error threshold (e.g., benefit of recursing further is too low); 2) a leaf node is reached; or 3) child nodes have not yet been transmitted to the method 600 (i.e., not yet "streamed" to the client).

As such, the recursion criteria of step 630 may comprise using a bit mask to indicate which regions of the LOD tree are present (e.g., have been streamed) to the renderer. This may comprise a prioritized request queue comprising a set of LOD regions of the model that method 600 would like to receive given the point of view selected at step 610. In addition, method 600 may comprise a separate process to request particular LOD nodes and to interrupt or otherwise inform method 600 when such requested LOD nodes become available. As such, parts of the LOD model may be transmitted in any order as long as the parents (e.g., parent nodes in the LOD tree) are transmitted before the children.

In a variation on the streaming approach described above, method 600 may employ a sequential point tree structure wherein nodes likely to be rendered at the same time are clustered together. For instance, nodes that are all visible and/or not visible from a particular point of view may be clustered together. As such, the hierarchical rendering described above may be replaced with sequential processing using a specialized GPU.

It will be obvious to those having skill in the art that many changes may be made to the details of the above-described embodiments without departing from the underlying principles of the invention. The scope of the present invention should, therefore, be determined only by the following claims.

I claim:

1. A method for pre-processing a point cloud data set, comprising:
   constructing an octree hierarchy from the point cloud data set;
   within the octree hierarchy, generating a level of detail (LOD) representative for each octree node;
   replacing a set of points within the point cloud data set with a quadrilateral;
   generating a texture for the quadrilateral;
   defining a grid within each octree leaf node;
   quantizing a position of a point remaining in the octree hierarchy to correspond to a grid cell within an octree leaf node; and
   storing the octree hierarchy in a computer readable storage location for access by a renderer to thereby provide for fast and efficient rendering of the stored octree hierarchy on a display for viewing by a user.

2. The method of claim 1, further comprising rejecting the quadrilateral if the quadrilateral does not satisfy a compactness threshold.

3. The method of claim 1, wherein generating a level of detail representative for an octree node comprises determining a simplification tolerance of the octree node.

4. The method of claim 3, wherein replacing a set of points within the point cloud data set with a quadrilateral comprises detecting a plane within an octree node using a RANSAC method.

5. The method of claim 1, further comprising generating a splat data structure comprising a splat texture for the point.

6. The method of claim 1, wherein generating a texture for the quadrilateral comprises projecting a portion of the point cloud data set onto the quadrilateral, the portion comprising points within the octree node of the quadrilateral within the simplification tolerance, such that the distance between any two points is substantially the simplification threshold of the LOD representative of the octree node.

7. The method of claim 1, further comprising, within each octree node, generating a textured quadrilateral in an octree node if a texel-to-shot ratio within the octree node is greater than four to one, and generating a composite splat within the octree node otherwise.

8. The method of claim 7, further comprising:
   for a first set of octree nodes, packing all of the textures into a texture atlas, and
   storing the texture atlas in a storage location.

9. The method of claim 8, wherein the first set of octree nodes comprises octree nodes having a common grandparent octree node.

10. A method for rendering a point cloud data set, comprising:
    obtaining an octree hierarchy comprising an octree node;
    selecting a rendering point of view;
       determining whether the octree node is visible and culling the node from the rendering process if the determining is negative;
       determining a projection error of the octree node;
       rendering the node if the projection error is below a projection error tolerance; and
       displaying the rendered node on a display for viewing by a user.

11. The method of claim 10, further comprising, traversing the octree hierarchy to a second higher level of detail octree node if the projection error of the octree node is above the projection error tolerance.

12. The method of claim 11, wherein rendering an octree node comprises accessing a texture associated with the octree node from a texture atlas.

13. The method of claim 10, wherein determining whether an octree node is visible comprises checking the visibility of the octree node from the selected rendering point of view using frustrum culling.

14. A method for pre-processing a plurality of point cloud data sets, the method comprising:
    calculating a point normal for each point in each of the plurality of point cloud data sets;
    computing a global transformation using the point normals;
    merging the plurality of point cloud data sets into a merged point cloud data set using the global transformation;
    simplifying the merged point cloud data set using a hierarchical level of detail (LOD) tree structure;
    for each tree node in the hierarchical LOD tree structure, generating a textured splat for the tree node if a point within the tree node comprises a point normal or generating a billboard point primitive for the tree node if a point therein does not comprise a point normal; and
    serializing the hierarchical LOD tree structure to a storage location for access by a rendering engine to provide fast and efficient rendering of the merged point cloud data set on a display for viewing by a user.

15. The method of claim 14, further comprising determining a surface normal for each point in the merged point cloud data set before simplifying the merged point cloud data set.

16. The method of claim 14, wherein computing a global transformation comprises using an iterative closest point, point-to-point or point-to-plane variant.

17. The method of claim 14, wherein determining a normal for each point in a point cloud data set comprises:
- selecting a point neighborhood associated with a point,
- calculating a covariance matrix of the point neighborhood, and
- selecting the normal as a unit eigenvector of the covariance matrix corresponding to a minimum eigenvalue of the covariance matrix.

18. The method of claim 14, wherein simplifying the merged point cloud data set using a hierarchical LOD tree structure comprises splitting the merged point cloud data set using a maximum eigenvector splitting approach, and wherein the maximum eigenvector splitting approach comprises:
- calculating a covariance matrix of a point set, and
- selecting a splitting plane based on an eigenvector of the covariance matrix corresponding to a maximum eigenvalue of the covariance matrix.

19. The method of claim 14, further comprising storing the serialized hierarchical LOD tree structure in a network accessible storage location.

20. The method of claim 14, wherein a node of the hierarchical LOD tree structure comprises a plurality of sixteen-bit color values.

21. A method for rendering a hierarchical LOD tree generated from a plurality of point cloud data sets, the method comprising:
- obtaining a reference to a hierarchical LOD tree;
- selecting a rendering point of view;
- determining whether a node in the hierarchical LOD tree structure is visible and requesting the node from a network accessible storage location if the determining is positive;
- determining a projected error $\epsilon$ of the node and traversing the hierarchical LOD tree structure to a higher level of detail node if the error $\epsilon$ is above an error threshold;
- rendering the node as a textured splat if the node has a normal; and
- rendering the node as a billboard if the node does not have a normal,
- wherein the rendering is to a computer display for viewing by a user.

22. The method of claim 21, wherein obtaining a reference to a hierarchical LOD tree comprises requesting a portion of the hierarchical LOD tree from a network accessible storage location.

23. The method of claim 21, further comprising, determining whether a node is available and, if the node is not available, requesting the node from the network accessible storage location.

24. The method of claim 21, wherein rendering the node as a textured splat comprises limiting a radius or elliptical radii of the splat to a LIDAR footprint.

25. The method of claim 21, wherein rendering the node as a billboard comprises limiting a footprint of the billboard to a LIDAR footprint.

* * * * *